March 25, 1952 C. O. HENNEMAN 2,590,408
DOUBLE CHECK QUICK FILLER VALVE
Filed Aug. 18, 1947
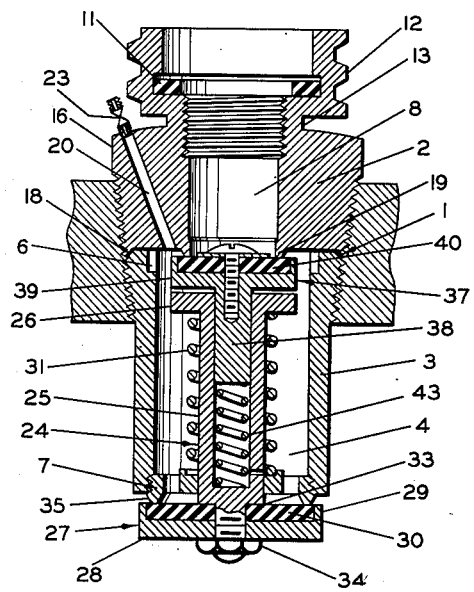
FIG. I
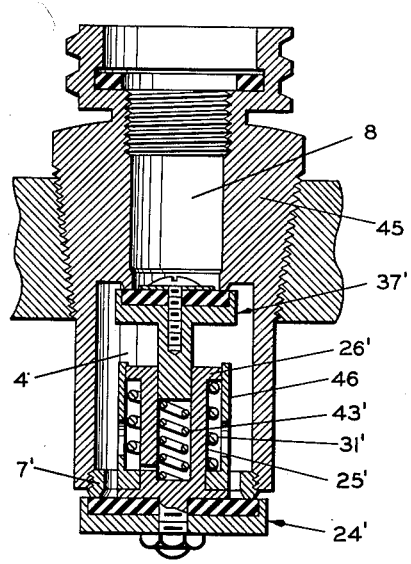
FIG. II
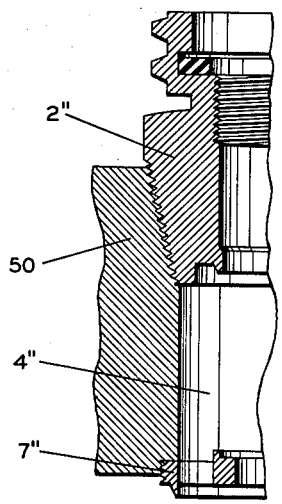
FIG. III
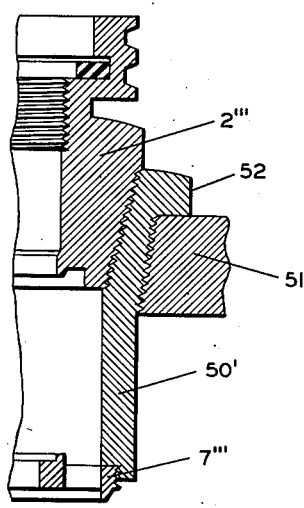
FIG. IV
INVENTOR.
C. O. HENNEMAN
BY Hudson and Young
ATTORNEYS Patented Mar. 25, 1952

2,590,408

UNITED STATES PATENT OFFICE 2,590,408

DOUBLE CHECK QUICK FILLER VALVE

Clarence O. Henneman, Bartlesville, Okla., assignor to Phillips Petroleum Company, a corporation of Delaware Application August 18, 1947, Serial No. 769,120

7 Claims. (Cl. 277—44)

This invention relates to a double check filler valve. In one of its more specific aspects it relates to a valve used in a system for storing and dispensing or transporting liquefied gases under pressure. In another of its more specific aspects it relates to a valve used in a liquefied petroleum gas storage tank and/or a motor vehicle fuel tank where the liquefied petroleum gas is being used as fuel for the motor vehicle.

One object of my invention is to provide a filler valve that is simple, safe, efficient and compact.

Another object is to provide a filler valve which will substantially reduce leakage from a liquefied gas container.

A further object is to provide a valve which is partially self compensating for the wear thereof.

Still another object is to provide a valve which can easily be tested for defectiveness.

A still further object is to provide a valve which may be partially removed and repaired without emptying the receptacle of its content of liquefied gas.

Yet another object is to provide a safe liquefied gas filler valve for use on motor vehicle fuel tanks.

Still another further object is to provide a valve which is economical to repair.

These and other further objects will be apparent from the drawing, the description herein contained and claims appended hereto.

This double check filler valve is a definite improvement over other valves known to the art. Valves such as this which have been used heretofore have not been successful in constantly preventing the seepage of gas from a storage or fuel tank. Single valves almost inevitably develop leaks and secondary valves are necessary to prevent leakage thereafter. It is intended that this filler valve should be utilized in fuel tanks for motor vehicles using liquefied gas as well as for storage tanks. The need for a "fool proof" valve for such usage is obvious. To allow the escape of gas in a confined building or garage would be disastrous. It is necessary that the secondary valve, used for safety purposes in such a device, be capable of assuming the entire burden of withstanding the gas pressure within the tank in which it is utilized without allowing it to seep out. This device has been designed so that it will prevent at all times, the seepage of gas and allow the primary valve to be repaired while retaining all gas in the tank by means of the secondary valve.

A second advantage which this device has over similar valves of the art is that it is quite compact. Its construction is such that it is relatively small and when inserted within a tank, the valves themselves are entirely below the surface of the tank. This assures retaining the gas in said tank even though the portion of the valve, which protrudes from the tank, should be sheared off.

Figure I is a cross-sectional view showing a preferred form of my invention.

Figure II is a cross-sectional view showing a modified form of my invention.

Figure III is a cross-section of a portion view showing a modification of construction of the device of my invention wherein an adapter is utilized as a part of the valve housing.

Figure IV is another cross-section of a portion view showing another modification of my invention.

In Figure I which shows a preferred embodiment of my invention filler valve housing 1 is preferably constructed of two body portions 2 and 3 which may be separately inserted into the valve opening in a liquefied gas storage tank. Body portion 3 is preferably tubular in shape with a passageway 4 therethrough. One end has a broad outer flange which is chamferred at the outer end corner and is threaded so as to screw into the valve opening of a liquefied gas storage tank or an adapter therefor. It is necessary only that the flange be sufficiently larger in diameter than the outer diameter of the remainder of body portion 3 that that portion will slide through the threaded tank or adapter opening to allow contact of the threaded opening with the threaded flange. The interior of that end of body portion 3 has grooves 6 provided therein to allow the insertion of an interior wrench for the purpose of tightening said body portion into position in said tank or adapter. The opposite end of body portion 3 is threaded internally to receive valve guide member or ring 7. It is within the scope of this device that body portion 3 may be threaded interiorly its entire length so that member 7 could be screwed therein from its outer end. Body portion 2 has passageway 8 therethrough, most of which is considerably smaller in diameter than passageway 4 through body portion 3. A portion at the outer end of passageway 8 is enlarged to substantially the diameter of passageway 4. The outer end of the smaller diameter of passageway 8 adjacent to the enlarged portion is provided with threads adapted to receive a supply conduit. The enlarged diameter of said passageway which is immediately adjacent said smaller diameter passageway is further enlarged to receive seal gasket 11. It is, however, not necessary to have such a further enlargement provided for the seal gasket but such enlargement is preferred as it does act as a retainer for the gasket. The exterior of body portion 2 is, at the end which has the enlarged passageway, provided with acme threads 12 to provide coupling means for a filler or supply conduit, not shown, or a cover cap. Adjacent acme threads 12, the body portion is provided with quick break groove 13. This groove is not essential to the operation of the filler valve but it is advantageous where the valve is used in a gas storage tank in such a position that it might be subject to a sudden blow, e. g., on a motor vehicle. The quick break groove will allow the portion of the valve housing which extends particularly beyond the surface of the tank to give way rather than rupturing the tank and allowing the liquefied gas to escape. Adjacent to break groove 13 is shoulder 16 which is ordinarily shaped to conveniently receive a wrench. From shoulder 16 to its inner end, body portion 2 is provided with threads to secure it to the storage tank or an adapter therefor. The outer corner of the threaded end of body portion 2 is provided with an extended chamferred portion 18 which co-acts with a chamferred portion of body portion 3 to form a gas tight connection therebetween. The inner corner of the same end of body portion 2 is extended to form valve seat 19. Valve seat 19 may, of course, be formed without such an extension but the extended construction is preferred for the device. Extending between passageway 4 and shoulder 16 is small conduit 20 which contacts the atmosphere at said shoulder. The conduit is provided with threads in shoulder 16 and a valve fitting is inserted therein. Valve 23 is attached to the valve fitting and is provided with a threaded connection for a pressure indicator which is not shown. Any small, conventional indicator may be utilized.

Valve 24 comprises stem 25 which is partially hollow and has an outwardly turned flange 26 and valve head 27. The hollowed stem has a small perforation therein to allow any liquid to drain from its interior. Valve head 27 comprises a recessed metal disk 28 with an outer rim 29 about the recess and a resilient compressible disk 30 fitted in the recess of the metal disk in such a manner that as valve head 27 is fastened to the valve stem, the disk is clamped between shoulder 33 of valve stem 25 and metal disk 28. Metal disk 28 may be fastened in place, by threading a hole drilled centrally therein, threading the small end shank of valve stem 25, screwing the disk onto the shank so that resilient disk 30 is held tightly against shoulder 33 and locking disk 28 in place by means of locknut 34. Metal disk 28 may in the alternative be drilled so that it will slide over the small shank of the valve stem. The resilient and metal disks may then be fastened in place by means of two locknuts. The method of fastening valve head 27 in place is not intended to be limited as any conventional method for securing a valve head or the like may be utilized.

Valve guide member or ring 7 is threaded on its outer periphery and has a hole centrally located therein which is of such size as to allow valve stem 25 to pass therethrough and to slidably support said valve stem. Guide member 7 has adjacent its outer periphery on one of its sides, a raised rim 35 which acts as a valve seat. The valve seat may or may not be an extended rim but the extended rim type is preferred in this device. Intermediate said seat and said guide passageway, the member is provided with at least one or more orifices therethrough for the passage of gas. Spring means are provided to close valve 24 which means preferably comprise helical spring 31 which, when assembled, extends between outwardly turned flange 26 and valve guide member 7 and exerts pressure which tends to force the two apart. In that manner resilient disk 30 is forced into contact with valve seat 35.

A second valve 37 is provided to be seated on valve seat 19. Valve stem 38 is preferably solid, though it should not be limited to such construction, and fits the interior of valve stem 25 so that valve stem 25 supports and acts as a guide therefor. Head 39 of valve 37 as of valve 24 is recessed and may be detachable as in valve 24 or may be cast or formed with the valve stem. A resilient compressible disk 40 is provided to fill the recess of head 39 to form a face therefor. Disk 40 may be held in place in any conventional manner, but it is preferred to drill head 39 and into stem 38 and to thread the hole thus provided. A bolt is then inserted through a washer and the resilient disk and screwed into the threaded hole until disk 40 is held in place thereby.

Before stem 38 is assembled with stem 25 spring 43, which is preferably helical and weaker than spring 31, is placed within the hollow of stem 25. Stem 38 is then inserted therein so as to compress spring 43 until head 39 contacts flange 26.

It will be noted that valve 24 must be assembled through guide member 7. In making the assembly, spring 31 is slipped over stem 25 which is then inserted through guide member 7. Spring 31 is then compressed sufficiently to allow valve head 28 to be attached to the valve stem. Guide member 7 is then screwed securely into body portion 3 after which body portion 3 is secured in the tank or adapter. Valve 37 is then assembled with and compresses spring 43 in stem 25 and body portion 2 is secured in said tank or adapter and seated against body portion 3.

In the operation of the double check filler valve shown in Figure I, spring 43 and spring 31 are compressed by pressure from the inflowing liquefied gas against valves 37 and 24 and the storage tank is rapidly filled. As the pressure from a feed of liquefied gas from an exterior source is removed, pressure within the tank becomes equal to or greater than the exterior pressure and allows springs 31 and 43 to operate to seat valve 37. As soon as valve 37 is seated, pressure within the tank tends to hold it closed, while spring 31 overcomes the pressure of and compresses spring 43 and thus tends to seat valve 24. As spring 31 forces valve 24 closed, such closure is resisted by gas pressure in the passageway between valve 37 and valve 27 and by spring 43. It will thus be seen that gas pressure within the passageway and spring 43 tend to prevent resilient disk 30 from being injured by being seated too securely. If resilient disk 40 or valve seat 19 should become defective so as to allow the escape of gas, the gas pressure differential between the tank and passageway 4 would cause valve 24 to be seated more securely to prevent leakage. In order to ascertain whether or not valve 37 has become defective, test conduit 20 and valve 23 have been provided. A pressure indicator may preferably be secured to the fitting on valve 23 so as to show at all times whether or not pressure is being maintained between the two valves in passageway 4. In the absence of a pressure indicator valve 23 may be operated manually. If gas escapes when said valve is opened, it shows that pressure is being maintained between the two valves while on the other hand, if no gas tends to escape, it will indicate that valve 37 is defective and valve 27 has been seated securely. It will be noted that the double check filler valve of this invention is quite novel in its construction and operation. Each of the check valves is actuated independently by means of separate springs. The spring actuating valve 37 is, however, weaker than the spring actuating valve 24. It will be seen that neither valve of this device is rigidly actuated by the other valve.

When tests or the pressure indicator show that valve 37 is leaking, body portion 2 can be removed from the tank or adapter and valve 37 extracted and repaired without emptying the tank of its content of liquefied gas.

The filler valve housing of Figure II is similar in design to that shown in Figure I with the exception that valve housing body 45 of Figure II is formed in one piece. The construction of Figure II also differs from that disclosed in Figure I, in that valve guide body 7' has a spring retainer ring 46 extending into passageway 4 beyond the outwardly turned flange 26' of valve 24' when valve 24' is in closed position. This spring retainer ring is perforated so that it will not collect rust and corrosion therein and has two functions other than that of acting as a spring retainer. One function is to act as a valve guide, guiding the flanged end of valve stem 25'. Another function is to prevent valve 24' from rigidly actuating valve 37' at any time during its operation. Valve stem 25' as indicated in Figure II is much shorter than that indicated in Figure I but has a perforation therein similar to stem 25 of Figure I. Its length has been shortened sufficiently so that the outwardly turned flange does not protrude beyond the spring retainer ring when valve 24' is in fully closed position. This modification in construction provides a safeguard which will prevent valve 24' from being opened by means of any pressure on valve 37' from an object protruded through passageway 3 from the exterior of said tank. The method of operation of spring 31' and spring 43' is the same as in the device of Figure I.

The modifications shown in Figure III and Figure IV are continued entirely in the valve housing structure. The valve housing of Figure III comprises two sections. The upper section is somewhat similar to that disclosed in Figure I of the drawing with the exception that it does not follow another section and set up against that section to make a joint. The lower section is, however, a passageway provided through adapter 50 which adapter may be large enough to contain several other valves or indicators therein. Passageway 4" is threaded at each end to allow the insertion of body portion 2" at one end and valve guide member 7" at the other end. The device of Figure IV is similar to that disclosed in Figure III in that the one portion of the valve housing comprises adapter 50'. The adapter utilized in this construction, however, is large enough only to adapt the double check filler valve to tank 51. Figure IV is also similar to Figure I in that the valve housing is formed of two sections and may be screwed into the tank from the top. Adapter 50' is threaded interiorly at each end to allow the insertion of housing member 2''' at one end and valve guide member 7''' at the other end. The exterior of the adapter, at its end which is provided with threads for valve housing member 2''', is also provided with a shoulder 52 which is preferably shaped to receive a wrench. Adjacent such a shoulder, the adapter is provided with threads utilized to secure said adapter in said tank body.

While I have shown in the drawing, several particular illustrative forms of my invention, various modifications may be made in the same and in the various features of construction without materially changing the invention therein. The modifications shown in any one figure of the drawing are not intended to be limited to the combination as shown in that figure. Formal changes may be made in the specific embodiments of the invention described without departing from the spirit and substance of the broad invention.

Having fully disclosed my invention, I claim:

1. A double check filler valve for a liquefied gas storage or fuel tank comprising in combination a valve housing having a passageway therethrough, part of which passageway is enlarged, said valve housing comprising two parts; a first valve seat on the inner end of a first housing part and within the passageway through the second housing part; a removable valve mounting means comprising a valve guide ring having a plurality of perforations therein intermediate its inner and outer peripheries, said guide ring forming a second valve seat outside the passageway through said second housing part; a first valve having a hollowed stem with perforations therein and being flanged outwardly at the end opposite the valve head, said valve head comprising a resilient compressible disk within the recess of a recessed metal disk, said resilient disk being positioned so as to be seated on said second valve seat; a relatively strong helical spring around said valve stem and extending from said valve guide on one end to said valve stem flange at the other end; a second valve having a recessed head with a resilient, compressible disk retained within said recess, said resilient disk being positioned so as to be seated on said first valve seat, the stem of said second valve being fitted within the hollowed interior of said first valve stem which acts as a guide and support for said second valve stem; and a weaker helical spring within said first valve stem and extending from the interior end of said hollowed stem to the end of said second valve stem, whereby said second valve is caused to be seated first and as the weaker spring is compressed by said strong spring said first valve is seated.

2. The double check filler valve of claim 1 wherein said first valve housing part is provided with a test conduit therethrough, and closure means for said test conduit.

3. A double check filler valve for a liquefied gas storage or fuel tank comprising in combination a valve housing having a passageway therethrough, said housing being in two parts; a valve seat on the inner end of a first housing part and within the passageway through the second housing part, the passageway through said second housing being of a larger diameter than said passageway through said first housing part; a removable valve mounting means comprising a valve guide ring having a plurality of perforations therein intermediate its inner and outer peripheries, said guide ring forming a second valve seat outside the enlarged passageway through said second housing part, which second valve seat is adjacent the outer periphery of said guide ring; a first valve having a hollowed stem with perforations therein and being flanged outwardly at the end opposite the head of said valve, said valve head comprising a resilient compressible disk within the recess of a recessed metal disk and said resilient disk when assembled being on the side of the said metal disk toward said flange; a relatively strong helical spring, said first valve stem being assembled through the coil of said strong spring and through said guide ring and valve head the resilient disk of said head when assembled being positioned so as to be seated on said second valve seat and said strong spring being positioned so as to exert pressure against said valve guide on one end and said valve stem flange at the other end; a valve spring retainer ring extending from said guide ring into the passageway within said second housing part and about and slightly beyond said flanged portion of said first valve stem when said first valve is in closed position; a second valve having a recessed head with a resilient, compressible disk retained within said recess and on the opposite side of said head from the valve stem, said resilient disk being positioned so as to be seated on said first valve seat, the stem of said second valve being fitted within the hollowed interior of said first valve stem; and a weaker helical spring within said first valve stem extending from the interior end of said hollowed stem against said second valve stem, whereby said second valve is seated first as said first valve moves toward closed position and as said weaker spring is compressed by said strong spring said first valve is seated.

4. A double check filler valve for a liquefied gas storage tank comprising in combination a valve housing having a passageway therethrough, part of which passageway is enlarged; a perforate valve guide member in said enlarged portion of said passageway; a first valve mounted in said valve guide, said first valve comprising a stem hollowed in one of its end portions, the hollowed end portion of said stem being within said enlarged passage portion and having a lip extending from the periphery of the hollowed end portion of said stem, and a valve head on the solid end portion of said valve stem, said valve head having a resilient, compressible face on its side adjacent said hollowed end portion of said stem and seated at the lower end of said enlarged passageway portion; a first helical compression spring extending about said hollowed stem from said guide member to said extending lip; a weaker helical compression spring within and supported by said hollowed stem; and a second valve comprising a stem and a valve head, said valve head having a resilient compressible face on its side opposite said first valve, said second valve stem being mounted in said hollowed stem of said first valve and supported by said weaker helical compression spring therein so as to seat said second valve against the end of the unenlarged passageway portion which is adjacent said enlarged passageway portion.

5. The double check filler valve of claim 4, wherein said valve housing is in two sections, one said section forming said unenlarged passageway portion and the other said section forming said enlarged passageway portion.

6. The double check filler valve of claim 4, wherein a valve spring retainer having a diameter smaller than the head of said second valve extends from said valve guide member into said enlarged passageway and beyond the hollowed end of said hollowed stem but spaced from said unenlarged passageway so as to allow said second valve to open.

7. A double-check filler valve for a liquefied gas storage or fuel tank comprising in combination a valve housing having a passageway therethrough; means for mounting a valve in the inner end of said passageway; a first valve mounted in said valve mounting means, said first valve comprising a stem hollowed in one of its end portions, the hollowed end portion of said stem being within said passageway, and a valve head on the solid end portion of said valve stem, said valve head having a resilient, compressible face on its side adjacent said hollowed end portion of said stem and seated at the lower end of said passageway; a compression spring extending about said hollowed stem from said mounting means and connected at its other end to said valve stem; a weaker compression spring within and supported by said hollowed stem; a second valve comprising a stem and a valve head, said valve head having a resilient compressible face on its side opposite said first valve, said second valve stem being mounted in said hollowed stem of said first valve and supported by said weaker compression spring therein so as to seat said second valve and to shut off said passageway intermediate its ends.

CLARENCE O. HENNEMAN.

REFERENCES CITED

The following references are of record in the file of this patent:

UNITED STATES PATENTS

| Number | Name | Date |
|---|---|---|
| 382,643 | Fox | May 8, 1888 |
| 1,711,133 | Bornefeldi | Apr. 30, 1929 |
| 1,812,361 | Nicholson | June 30, 1931 |
| 2,361,866 | Norway | Oct. 31, 1944 |

FOREIGN PATENTS

| Number | Country | Date |
|---|---|---|
| 109,850 | Australia | Feb. 29, 1944 |